Jan. 10, 1961 R. F. LONG 2,967,629
CONCRETE BATCHING PLANT STRUCTURE
Filed Jan. 30, 1958

INVENTOR.
RUSSEL F. LONG.
BY Willard S. Groen
ATTORNEY.

United States Patent Office 2,967,629
Patented Jan. 10, 1961

2,967,629
CONCRETE BATCHING PLANT STRUCTURE
Russell F. Long, 1045 W. Maryland, Phoenix, Ariz.
Filed Jan. 30, 1958, Ser. No. 712,242
2 Claims. (Cl. 214—2)

This invention pertains to improvements in concrete batching plants and is particularly directed to a completely self-contained unit, which may be used portably, for handling small and medium sized concrete jobs at remote and isolated locations.

One of the objects of this invention is to provide a self-contained concrete batching plant which may be readily transported and moved about to various job locations with a minimum of effort and trouble upon the part of the contractor.

Still another object of this invention is to provide a concrete batching plant structure incorporating a plurality of sand, gravel and cement hoppers which supply materials to a series of continuously weighing and measuring conveyor belts all dumping into a common discharge hopper and in which the cement hopper discharges through a screw conveyor to its respective weighing and measuring conveyor belt.

Still another object of this invention is to provide an arrangement wherein the discharge outlets of the various sand and gravel supply hoppers is closely positioned relative to the conveyor belts so that the stopping and starting of said belts effects the discharge or non-discharge of materials from these hoppers.

Still another object of this invention is to provide the positive screw feed conveyor for the cement hopper which may be stopped and started for resting or discharging material from the cement hopper bin.

Still another object of this invention is to provide in a concrete batching plant structure having a plurality of hoppers for containing the sand, gravel and cement in separate supply hopper bins, a plurality of conveyors in which the sand and gravel conveyors having weighing mechanism in connection therewith are located in the same horizontal plane while a third receiving and measuring conveyor is located above said two weighing conveyors, all of said conveyors discharging into a common discharge hopper having distributing means for discharging the aggregate and cement materials as required on the job. It is to be understood that a fourth receiving and measuring conveyor may be located above said two weighing conveyors making an additional unit available where concrete specifications require that gravel be classified as medium and coarse and be graded, piled and weighed separately.

A still further object of this invention is to provide in a concrete batching plant structure as recited above an arrangement which automatically and continuously selects the proper amount of sand aggregate and cement while the materials are constantly in motion from the supply hoppers to the ultimate discharge conveyor.

Further features and advantages of this invention will appear from a detailed description of the drawings in which.

Figure 2:
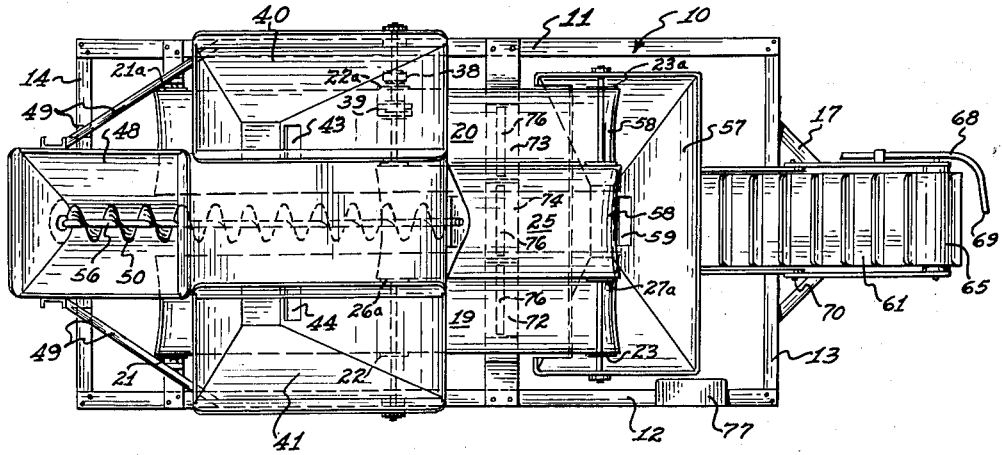
Fig. 2 is a plan view of the apparatus shown in Fig. 1.
Figure 1:
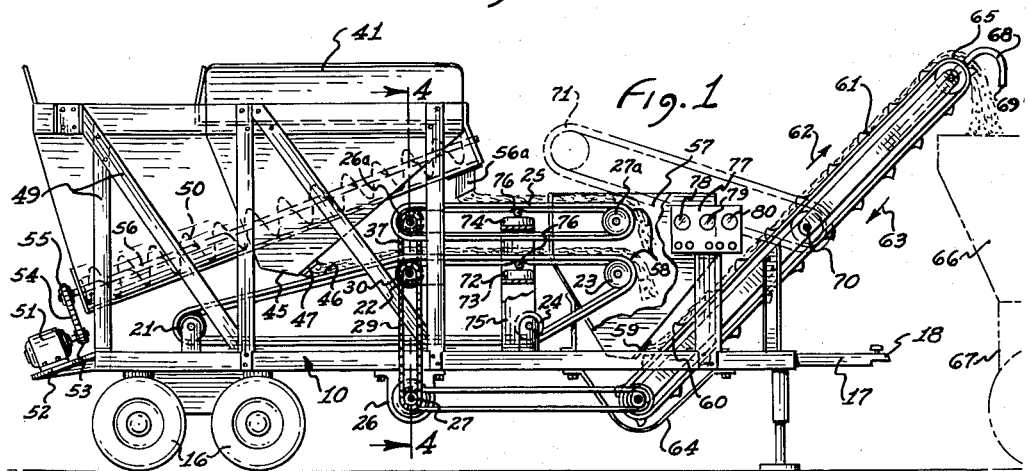
Fig. 1 is a right hand side elevation of a portable concrete batching plant incorporating the features of this invention.
Figures 3, 4:
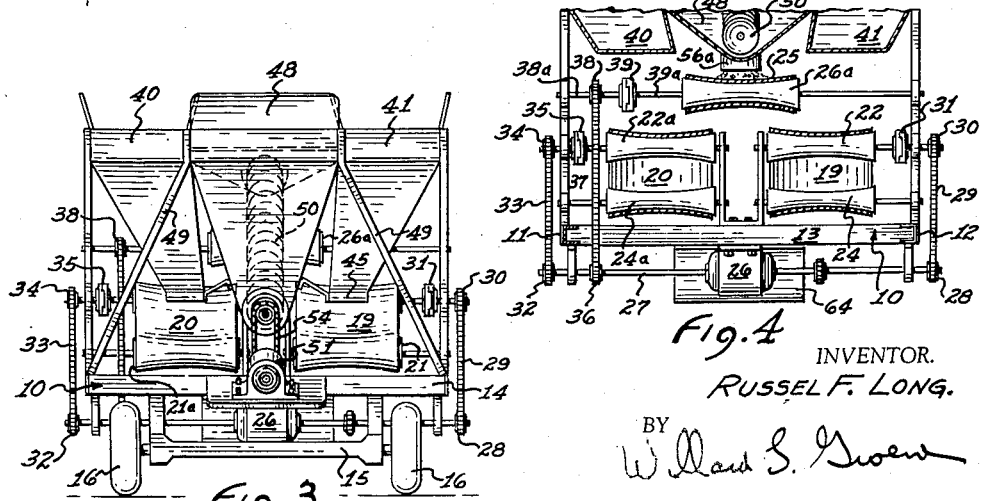
Fig. 3 is a rear end elevation of the apparatus shown in Figs. 1 and 2.
Fig. 4 is a section on the line 4—4 of Fig. 1.

As an example of one embodiment of this invention there is shown a portable concrete batching machine having a frame 10 comprising the side rails 11 and 12 and the end rails 13 and 14 rigidly secured together. The frame 10 is suitably suspended on an appropriate axle 15 and road wheels 16 and a tongue 17 having a hitch 18 provided at the front end of the frame 10 for attachment to a towing vehicle for transportation of the plant to the job site.

A pair of laterally spaced conveyor belts 19 and 20 are suitably carried on concave pulleys 21, 21a, 22, 22a, 23, 23a, 24 and 24a journaled on the frame 10. Above the conveyor belts 19 and 20 is a third conveyor belt 25 carried on suitable concave pulleys 26a and 27a journaled on the frame 10. A suitable drive motor 26 fixed on the frame 10 has a shaft 27 extending out each end of the motor to one end of which is fixed the drive sprocket 28 over which operates a chain 29 connected to the sprocket 30 fixed on the driving member of a magnetic clutch 31 having its driven member fixed to the pulley 22 of the conveyor belt 19. The other end of the motor shaft 27 has a sprocket 32 fixed thereto over which operates the chain 33 connected to the sprocket 34 fixed to the driving member of a magnetic clutch 35 having its driven member fixed to the pulley 22a of the conveyor belt 20. Also, a sprocket 36 is fixed on the motor shaft 27 over which operates a chain 37 which is connected to a sprocket 38 fixed to the driving member 38a of a magnetic clutch 39 having its driven member 39a connected to the pulley 26a of the conveyor belt 25. Thus, with drive motor 26 operating, by appropriately energizing the magnetic clutches 31, 35 and 39, the associated conveyor belts 19, 20 and 25 may be started or stopped as required.

A pair of supply hoppers 40 and 41 are mounted on suitable support members fixed to the frame 10, the hopper 40, for example, being supplied with sand and the hopper 41 being supplied with aggregate. On the converging bottom ends of each of the recited hoppers are provided suitable discharge openings 43 and 44 having their bottom edges 45 positioned closely adjacent to the top surfaces 46 of the conveyor belts 19 and 20, with a suitable vertically adjustable edge 47 on the front of each discharge outlet 43 and 44 to vary the discharge from the hoppers 40 and 41 when the conveyor belts are operating. It is to be understood that suitable screw conveyors may be utilized in the bottom of the hoppers 40 and 41, similarly to the screw conveyor 50 for the hopper 48, to deliver material to the belts 19 and 20.

A third supply hopper 48 for the dry cement is mounted on suitable support members 49 fixed to the frame 10 and has in the bottom thereof an upwardly sloping screw conveyor 50 which is driven by a motor 51 fixed on a bracket 52 in turn suitably fixed to the frame 10. A sprocket 53 fixed on the motor shaft actuates a chain 54 operating over the sprocket 55 fixed to the shaft 56 of the screw conveyor 50. The discharge from the screw conveyor 50 is dropped through the usual sock 56a onto the conveyor belt 25.

At the discharge end of the conveyor belts 19, 20 and 25 is a receiving hopper 57 suitably fixed to the frame 10 and adapted to receive all material discharged at the ends 58 from all of the conveyor belts and to discharge the material through its discharge outlet 59 on to the receiving end 60 of the discharge conveyor 61 traveling in the direction indicated by the arrows 62 and 63. The conveyor 61 is suitably mounted on the frame 10 and surrounded at its lower receiving end 60 by an appropriate pick-up pan 64 fixed to the frame 10. Discharge from the upper end of the discharge conveyor 61 at the discharge end 65 may be presented in the usual receiving hopper 66 of a mixer truck 67. A water injection line 68 having a discharge end 69 may be provided at the outer end 65 of the discharge conveyor 61. The discharge conveyor 61 may preferably be hinged at 70 so it may be swung back to position 71 when the unit is traveling the road. It is to be further understood that discharge from the receiving hopper may be made directly to the mixer truck or other job area as required.

Suitable integrating weighing and measuring conveyor scale mechanism of conventional design such as shown for example in Patent 1,619,123 of the Bell Automation Corporation Electro-way continuous weighing system is provided at 72, 73 and 74 for each of the respective conveyors 19, 20 and 25 for determining the amount of materials being delivered by the belts, these scale mechanisms being suitably mounted on a bracket 75 secured to the frame 10 between the discharge outlets 43 and 44 and the sock 56a, and the discharge ends 58 of the belts 19, 20 and 25. The electronic type scales include laterally extending rollers 76 engaging the underside of the belts 19, 20 and 25 so that pressure from the load on the conveyor belts is converted into a directly proportional quantity of electrical energy. The speed of the belt is also transmitted through the laterally extending rollers and is delivered along with electrical energy from the weighing function to suitable electrical indicating apparatus control panel 77 wherein the information from the weight and speed of the belts is integrated for direct reading of the supply being furnished by each belt on suitable indicating dials 78, 79 and 80 in a well known conventional manner. It is understood that this apparatus may be controlled from the panel 77 to stop and start the belts 19, 20 and 25 and the screw conveyor to regulate the supply of materials into the receiving hopper 57.

By this arrangement the operator may condition the controls 78, 79 and 80 of the control panel 77 to start the operation of all of the belts 19, 20 and 25 and the screw conveyor 50 simultaneously for a period of time required to deliver a prescribed amount of sand, gravel and cement to the receiving hopper 57 to thus make up the specifications of a particular batch of concrete. The belts operate simultaneously but may be operated individually so as to clear the machine at the end of the day's run or end of the job without mixing the materials together. Thus materials may be replaced in original storage locations. Electrical controls should be equipped with a hand-off-automatic switch. Thus, a very rapid and efficient operation of batching concrete may be obtained and a high degree of accuracy of specifications efficiently obtained.

While the apparatus herein disclosed and described constitutes a preferred form of the invention, it is also to be understood that the apparatus is capable of mechanical alteration without departing from the spirit of the invention and that such mechanical arrangement and commercial adaptation as fall within the scope of the appendant claims are intended to be included herein.

Having thus fully set forth and described this invention what is claimed and desired to be obtained by United States Letters Patent is:

1. A concrete batching machine having, a frame, a plurality of material supply hoppers fixed on said frame, a conveyor, one for each of said hoppers, mounted on said frame, a discharge opening in each of said hoppers communicating with each of said conveyors, a source of driving power, means for concurrently and individually connecting and disconnecting said source of driving power relative to each of said conveyors so that said conveyors can operate concurrently and individually, an individual sensing device connected to each conveyor responsive to the amount of material delivered by each conveyor and connected to control said connecting and disconnecting means, a common receiving hopper fixed on said frame adapted to consolidate the discharged materials from said conveyors to a common discharge point, and adjustable indicating and control means for each of said sensing devices adapted to determine the amount of material to be delivered by each conveyor into said common receiving hopper.

2. A concrete batching machine as set forth in claim 1 wherein the delivery movement of said conveyor for each hopper causes the discharge from said respective hopper to be presented on its respective conveyor and wherein arresting said conveyor movement stops discharge from said hopper onto said conveyor.

References Cited in the file of this patent

UNITED STATES PATENTS

| | | |
|---|---|---|
| Re. 23,940 | Fisher | Feb. 8, 1955 |
| 1,619,123 | Hem | Mar. 1, 1927 |
| 1,778,393 | Klugh | Oct. 14, 1930 |
| 1,973,312 | Hardinge | Sept. 11, 1934 |
| 2,727,733 | Carswell | Dec. 20, 1955 |
| 2,882,036 | Lyons | Apr. 14, 1959 |

OTHER REFERENCES

Pamphlet on Continuous Weighing System, issued by Bell Automation Corp., Mar. 1956, and made part of the record in this case.